July 29, 1952          E. M. BARBER          2,605,175
INTERNAL-COMBUSTION ENGINE PRODUCTION OF SYNTHESIS GAS
Filed Dec. 7, 1948
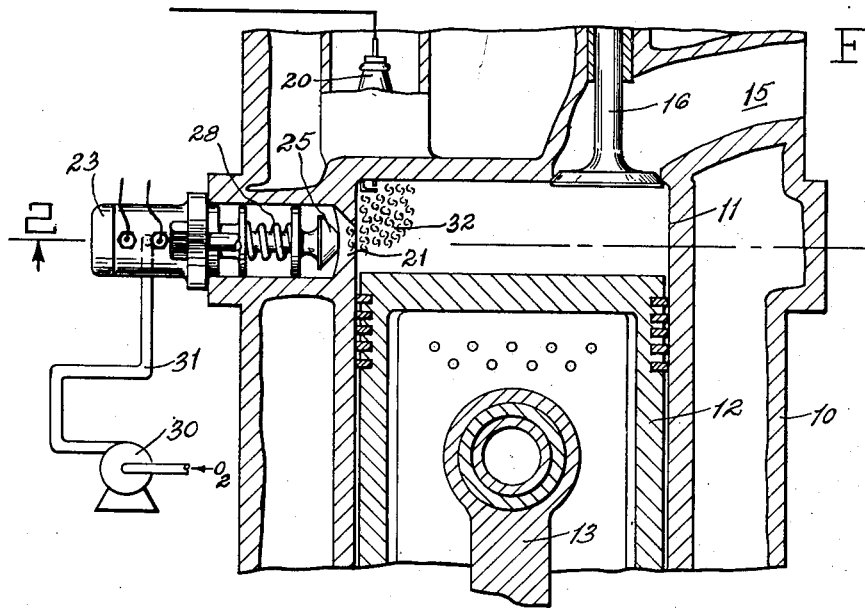
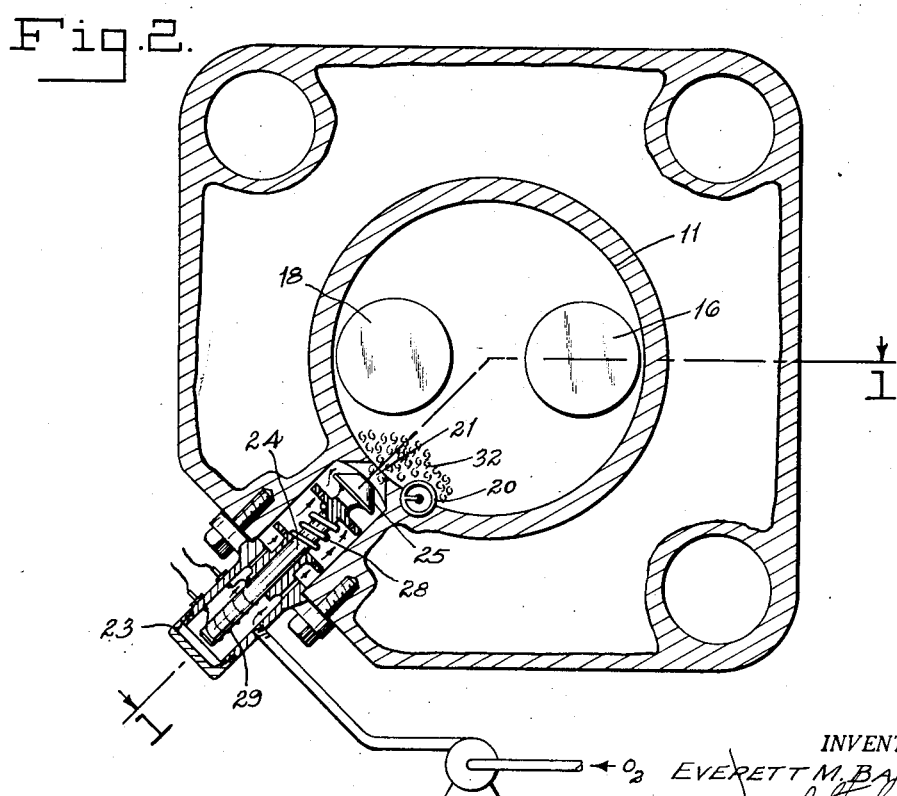
INVENTOR.
EVERETT M. BARBER
BY
ATTORNEYS Patented July 29, 1952

2,605,175

UNITED STATES PATENT OFFICE 2,605,175

INTERNAL-COMBUSTION ENGINE PRODUCTION OF SYNTHESIS GAS

Everett M. Barber, Wappingers Falls, N. Y., assignor to The Texas Company, New York, N. Y., a corporation of Delaware Application December 7, 1948, Serial No. 64,005

3 Claims. (Cl. 48—212)

The present invention relates to the preparation of a synthesis gas containing essentially hydrogen and carbon monoxide in proportions suitable for the catalytic synthesis of hydrocarbons, oxygenated hydrocarbons, and mixtures thereof, and more specifically, it involves the production of synthesis gas from oxygen and suitable carbonaceous material, while simultaneously realizing the substantial, continuous production of mechanical energy by effecting the reaction in an internal combustion engine.

In accordance with the present invention, a carbon containing material, such as a hydrocarbon gas, for example, methane or natural gas, mixed with oxygen, preferably of high purity, is supplied to the combustion chamber of an internal combustion engine, preferably of the reciprocating type, in proportions which desirably approximate the theoretical combining proportions for the production of hydrogen and carbon monoxide. The mixture is compressed, and at the approximate instant of ignition or firing, preferably simultaneously therewith, a supplemental stream of oxygen gas is injected into a predetermined, localized section of the combustion chamber in such a manner as to intermix with the reactants and to form an envelope or shroud of gas relatively rich in oxygen about the point of ignition.

It is contemplated that the portion of oxygen within the localized zone of oxygen enrichment shall be substantially in excess of theoretical for partial combustion of the hydrocarbon to hydrogen and carbon monoxide, for example, a 50 or 100 per cent excess. As will hereinafter appear, it is advantageous to use even greater excesses within the localized zone of enrichment, ranging from 5 to 20 times the theoretical oxygen requirement. The theoretical oxygen requirement as regards the present process may be succinctly expressed on the basis of the atomic ratio of oxygen to carbon (O/C) contained in the total feed. The theoretical O/C ratio is 1:1. Locally, within the zone of enrichment, therefore, the actual ratio of oxygen to carbon may correspond to an O/C ratio of from 2:1 to 20:1 without materially raising the overall O/C ratio of the total feed.

Under the foregoing conditions, propagation of the explosion is rapid, the process of combustion being materially accelerated with a corresponding improvement in yield of the desired product and increase in mechanical energy realized. The reaction products are withdrawn on the exhaust stroke and operation continued in the usual cyclic manner of the reciprocating engine.

The localized zone of oxygen enrichment advantageously occupies only a minor portion of the total combustion chamber volume, as for example, not more than 10 per cent and preferably not above 5 per cent of the cylinder volume, the remaining combustion space containing the original oxygen-hydrocarbon mixture in proportions such that the overall oxygen supplied at least equals theoretical.

The present invention is of particular advantage in that it enables continuous engine generation of synthesis gas at a substantial saving of relatively high cost, pure oxygen. The use of high purity oxygen is dictated by the necessity of producing an exhaust gas which comprises essentially hydrogen and carbon monoxide, and is substantially free of undesired nitrogen and other contaminants. Advantageously, therefore, the feed oxygen is at least about 85 per cent purity, preferably above about 90 to 95 per cent purity, such as is produced by the liquefaction and rectification of air.

Among the more serious problems encountered in this type of operation is that of spark plug fouling. As intimated above, using an ordinary Waukeshaw 3C CFR engine with a compression ratio of 3.5:1 and an intake manifold pressure of about atmospheric, plug fouling is serious at a natural gas-total pure oxygen feed such that the atomic O/C ratio is below about 1.30, corresponding to about 30 per cent excess of oxygen over the theoretical. While even greater excesses of oxygen are normally required to assure continuous engine operation without fouling, preignition becomes severe at an O/C ratio of about 1.50–1.55, leaving only a narrow range of satisfactory operation.

Within an intake manifold pressure of 50 pounds per square inch gauge, severe plug fouling is experienced at about 1.15 O/C and below, while preignition becomes severe at about 1.40 O/C and above. Operating in this limited range, it is apparent, first, that a substantial excess of costly oxygen is necessary, and second, that careful control of the excess is necessary to prevent preignition.

The present invention permits operation at lower overall ratios of O/C without plug fouling.

Moreover, preignition is eliminated as a problem during compression because the O/C ratio of the mixture being compressed may be substantially below what would otherwise be necessary. Since, however, the localized oxygen injection is coordinated with the desired firing time, the excess of oxygen in this zone becomes immaterial as regards preignition and actually, as will hereafter appear, may form, per se, a desirable and effective ignition means.

In addition, the mechanical energy output, as intimated above, is increased as the result of the more rapid initiation and propagation of the flame from the oxygen-rich zone.

Of even greater importance from the standpoint of practical operation, so-called flash back is prevented. Flash back as used herein, refers to the results of slow fuel burning in the combustion chamber such that combustion is still in process at the time the intake valve opens to admit charge for the next compression stroke. Under such conditions, the inlet feed mixture may be ignited in the manifold, and operation impaired.

The present invention accordingly contemplates introduction to the combustion chamber prior to the compression stroke of a mixture of hydrocarbon and oxygen in a proportion below the carbon fouling range and preferably about or even below the theoretical O/C ratio of 1:1. Surprisingly, it has been found that manifold mixtures having O/C ratios as low as 0.7:1 may be used where the incremental, localized oxygen injection is sufficient to provide the theoretical oxygen requirement.

It is contemplated that the total oxygen included in the original mixture, plus that injected at the time of ignition, shall result in an overall O/C ratio approaching as closely as possible the theoretical of 1:1, that is, preferably below about 1.15, resulting in a material lowering of overall oxygen requirements as compared with conventional practice. As a direct result of reduced overall oxygen requirement, the product gas contains less diluents such as nitrogen introduced with the oxygen required, and the undesired byproducts such as carbon dioxide and water vapor which necessarily follow when excess oxygen is used. From the foregoing, it is also apparent that maximum yields of the desired carbon monoxide and hydrogen are realized from each unit of carbonaceous fuel employed.

One illustrative embodiment of the present invention is disclosed in the attached drawing, in which Fig. 1 is an elevational section on the line 1—1, and Fig. 2 is a planed section taken on a line 2—2 of Fig. 1. The arrangement disclosed in the drawing embodies a portion of an engine block 10, comprising a cylinder 11 fed with a piston 12, having a connecting rod 13 which, it will be understood, connects with a crankshaft in the usual manner. A gaseous mixture of hydrocarbon and oxygen enters from an intake conduit 15 past valve 16 on the so-called intake or suction stroke, and the discharge of the combustion products is effected past valve 18 in Fig. 2.

Ignition means is provided in the form of a spark plug 20 disposed in close proximity to an injection port 21. The injection port 21 is controlled by an injection valve mechanism comprising an outer housing 23 which slidably supports a valve stem 24 surmounted by a tapered valve head 25.

It should be particularly noted that the figures of the drawing illustrate the relative position of the ports during oxygen injection, just prior to ignition of the mixture, at which time the valve head 25 is retracted to uncover the port 21. At all other times, the tapered port opening 21 will be occupied and sealed by the valve head 25. Spring 28 normally retains the valve in closed position, and solenoid means more or less symbolically indicated in the form of an actuated coil 29 effects the timed opening of the valve in synchronism with engine operation. The housing 23 is continuously supplied with preferably high purity oxygen from pump 30 and pipe 31 under a substantial pressure above that prevailing within the cylinder at the time of oxygen injection. Any conventional oxygen metering device, not shown, may be interposed in pipe 31 to additionally control the quantity of oxygen injected.

In operation, it will be understood that the feed mixture of hydrocarbon and oxygen supplied past inlet valve 16 enters the cylinder and is compressed therein. At the point of compression, indicated in the drawing, timed actuation of the solenoid 29 opens valve 25 and permits a predetermined quantity of pure oxygen to enter the cylinder at a localized region about the electrodes of the spark plug, as indicated at 32 in the figures.

This having been accomplished, the valve snaps closed and actuation of ignition device 20 takes place in an oxygen-rich combustible mixture.

As above indicated, the combustion in the zone of localized oxygen enrichment is intense and immediate, setting up an active flame front at its boundaries. Since the initial flame surface occupies a very substantial area, the combustion of the remainder of the mixture by the advancing flame front is materially expedited, as contrasted with the more substantial time lag between firing of the spark plug and completion of combustion in ordinary engine operation. That is to say, in the absence of localized oxygen injection, about the ignition device, ignition proceeds with difficulty from what in effect amounts to a point of initiation, at which flame formation is relatively minute. On the other hand, in accordance with the present invention, an initial flame of vastly multiplied area is set up such that the finite time occupied by progression of the flame front throughout the combustible mixture is sharply decreased.

This effect is obviously of advantage, not only from the standpoint of the additional, useful mechanical energy made available, but more important in that it causes the complete and early consumption of the reactants such that the cylinder is completely free from residual burning gases beyond the opening of the intake valve. Accordingly, preignition and backfiring are effectively prevented.

By way of example, a four-stroke cycle engine of the above general construction, having a compression ratio of about 3.5:1, a spark advance of about 15° B. T. C., is supplied with a feed comprising oxygen of better than 99 per cent purity and a natural gas having the following composition:

| | Per cent |
|---|---|
| $CH_4$ | 83.6 |
| $C_2H_6$ | 10.2 |
| $C_3H_8$ | 4.5 |
| $C_4H_{10}$ (and heavier) | 0.1 |
| $CO_2$ | 1.0 |
| $N_2$ | 0.5 |
| $O_2$ | 0.1 |

The intake manifold is supplied continuously with said feed gases mixed in an O/C ratio of about 0.94:1 at a pressure of about 50 pounds p. s. i. g. The mixture is drawn into the cylinder on the combustion stroke and at about 16° B. T. C. is subjected to injection of incremental oxygen in amount not more than 5% of the volume being supplied to the intake manifold. The injected oxygen is selectively injected about the exposed extremity of the spark plug. At 15° B. T. C., sparking occurs, effecting explosion of the mixture and subsequent downstroke of the piston, followed by the normal exhaust stroke.

Under such conditions, the engine operates continuously with no spark plug fouling, preignition or flash back. Operation can be continued indefinitely. The yield of CO on the basis of carbon in the total feed approximates 95 per cent. The typical exhaust gas contains hydrogen and carbon monoxide in approximately a 2:1 ratio with only a minor proportion of methane and carbon dioxide, amounting usually to not more than 2 to 3 per cent.

In contrast, when the step of oxygen injection is terminated, the engine soon becomes inoperative from plug fouling even when the stream of oxygen previously injected about the spark plug is diverted into the intake manifold so that the overall O/C ratio in the cylinder is the same.

While particular emphasis has been placed in the foregoing embodiments upon the use of normally gaseous fuel hydrocarbons, it is to be understood thtat in the broadest aspect of the invention, the hydrocarbonaceous feed materials may be selected from those which are normally gaseous, liquid or solid in form, capable of being reacted with an oxygen containing gas in an internal combustion engine. Typical examples are natural gas, liquid petroleum fractions such as naphtha, kerosene, gas oil and fuel oil, and even powdered coal, all contemplated within the term "hydrocarbon" or "hydrocarbonaceous material." It will be appreciated, of course, that normally liquid materials are preferably introduced in the form of a gas or vapor, whereas solid fuels, such as coal, are suspended in the form of a fine powder.

In place of the engine exemplified above, provision may be made for separate introduction of the hydrocarbon and oxygen streams into the cylinder prior to compression, as for example, by separate manifold and valve arrangement.

It is to be noted that beneficial results in respect to yield follow from preheating of the reactants. The hydrocarbon, for example, methane, may be preheated to a temperature in the order of 1000° F. or higher, and the oxygen to, for example, 800° F. or above.

The present invention is of further advantage in that the mixed reactants are less susceptible to spontaneous ignition during preheating by virtue of their relatively lower O/C ratio. From this follow the recognized advantages of supplying an essentially uniform admixture for firing.

Obviously, many modifications and variations of the invention, as hereinbefore set forth, may be made without departing from the spirit and scope thereof, and therefore, only such limitations should be imposed as are indicated in the appended claims.

I claim:

1. In a process for the production of carbon monoxide and hydrogen by the partial combustion of a hydrocarbonaceous fuel with oxygen in an internal combustion engine wherein a mixture of said hydrocarbonaceous fuel and oxygen in approximately the required proportions for substantially complete conversion of said fuel to carbon monoxide and hydrogen is compressed and ignited in the combustion zone of an internal combustion engine, the improvement which comprises injecting a minor amount of additional oxygen into said mixture following compression and at the approximate instant of ignition into a localized minor section of the combustion zone whereby the oxygen concentration within said section is at least 50 per cent in excess of that amount theoretically required for partial combustion of the fuel in said section to carbon monoxide and hydrogen, and initiating ignition of the mixture within said localized section of the combustion zone.

2. A process as defined in claim 1 wherein the concentration of oxygen within said localized section ranges from 5 to 20 times the theoretical oxygen requirement for partial combustion of the fuel in said section to carbon monoxide and hydrogen.

3. A process as defined in claim 2 wherein said localized section of the combustion zone occupies not more than about 5 per cent thereof by volume.

EVERETT M. BARBER.

REFERENCES CITED

The following references are of record in the file of this patent:

UNITED STATES PATENTS

| Number | Name | Date |
|---|---|---|
| 905,433 | Johnson | Dec. 1, 1908 |
| 1,054,080 | Bachmann | Feb. 25, 1913 |
| 2,363,708 | Urguhart | Nov. 28, 1944 |
| 2,376,479 | Fehling | May 22, 1945 |
| 2,484,249 | Ruble | Oct. 11, 1949 |